US006603636B2

(12) United States Patent
Schwandt et al.

(10) Patent No.: US 6,603,636 B2
(45) Date of Patent: Aug. 5, 2003

(54) APPARATUS FOR CENTERING A DISC CLAMP ON A DISC PACK IN A DISC DRIVE

(75) Inventors: Mark Allen Schwandt, Mead, CO (US); Howard Sohm, Longmont, CO (US); Kimber Lee Skidmore, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 175 days.

(21) Appl. No.: 09/896,322

(22) Filed: Jun. 29, 2001

(65) Prior Publication Data

US 2002/0109939 A1 Aug. 15, 2002

Related U.S. Application Data

(60) Provisional application No. 60/267,797, filed on Feb. 9, 2001.

(51) Int. Cl.[7] .............................................. G11B 17/02
(52) U.S. Cl. ..................................................... 360/99.12
(58) Field of Search ............................ 360/98.08, 99.12

(56) References Cited

U.S. PATENT DOCUMENTS

| 5,075,808 A | 12/1991 | Johnson ................... 360/98.08 |
| 5,101,306 A | 3/1992 | Johnson ................... 360/98.08 |
| 5,659,443 A | 8/1997 | Berberich ................ 360/98.06 |
| 5,880,905 A | 3/1999 | Kazmierczak et al. ... 360/98.08 |
| 6,130,801 A | 10/2000 | Cheng et al. ............ 360/98.08 |
| 6,212,031 B1 | 4/2001 | Kazmierczak et al. ... 360/98.08 |

*Primary Examiner*—A. J. Heinz
(74) *Attorney, Agent, or Firm*—Merchant & Gould P.C.

(57) ABSTRACT

A disc tolerance ring for centering a disc clamp on a spindle hub. The disc tolerance ring has a first surface and a second surface. The first surface is located between an inner edge of the disc clamp and an outer surface of the spindle hub. In specific embodiments, the disc tolerance ring has a first circumferential section and a second circumferential section and the first circumferential section is a continuous band and the second circumferential section includes alternating notches and members depending from the first circumferential section.

18 Claims, 6 Drawing Sheets

APPARATUS FOR CENTERING A DISC CLAMP ON A DISC PACK IN A DISC DRIVE

RELATED APPLICATIONS

This application claims priority of U.S. provisional application Ser. No. 60/267,797, filed Feb. 9, 2001.

FIELD OF THE INVENTION

This invention relates generally to the field of hard disc drive data storage devices, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative aerodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5 degrees Celsius to 60 degrees Celsius, and further be specified to be capable of withstanding operating mechanical shocks of 100 G or greater without becoming inoperable.

One of the areas of disc drive design which is of particular concern when considering ambient temperature variations and mechanical shock resistance is the system used to mount and clamp the discs to the spindle motor. During manufacture, the discs are mounted and clamped to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted and clamped to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor exist. In each of these disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until an intended disc stack is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

It is important that the discs and clamp are centered on the hub so to insure that the discs are balanced when rotating at high speeds. Imbalances are partially caused by the tolerances between the spindle and the clamp inner diameter. Because the clamp has to slide onto the spindle, there is room for the clamp to move relative to the spindle. For example, typically a clamp inner diameter has a tolerance of ±0.002 inches. These tolerance limitations cause imbalances when the disc is rotating due to movement between the spindle and the clamp. A method used to correct imbalances caused by limitations of the existing systems is to bias the discs on the hub.

An example of a disc pack assembly of the prior art is shown in FIG. 1. As is generally known in the art, the illustrative disc drive unit 610 includes a head positioner assembly 611 mounted within the housing 616 at a position along the disc pack. A central shaft 620 having a central axis is securely fixed to a portion of the housing 616, and information storage disks 614 are mounted for rotational movement within the housing 616 about the shaft 620. A first information storage disc 614 is stacked on top of a hub flange 632. A disc spacer 648 is stacked on top of the first information disc and a second disc 614 is stacked on top of the disc spacer 648. A disc clamp assembly 658 including a clamp ring 660 and a grip ring 662 secure the information storage discs to the spindle hub 626. The clamping ring 660 has an inner diameter larger than the outer diameter of the spindle hub 626, so that the clamping ring 660 can be slipped over the spindle hub 626 and rest on the top surface of the support ring 649. Generally, the clamping ring 660 further has a rounded convex surface 664 near the outer periphery, so that the clamp force is applied away from the inner diameter of the information storage discs 614. The clamping ring further has a raised inner portion 666 on which the lower surface of the grip ring 662 rests.

There is a need for a simple means and device to align the clamping assembly components in a disc drive during assembly such that they are and accurately centered on the disc pack. The present invention, described below, provides a solution to this and other problems, and offers other advantages over the prior art.

SUMMARY OF THE INVENTION

Against this backdrop the present invention has been developed. An embodiment of the present invention is directed to a disc clamp tolerance ring for reducing movement of the disc clamp, and allowing the disc clamp to be more precisely centered on the spindle. The disc clamp tolerance ring is located between an inner diameter of the disc clamp and the spindle. The disc clamp tolerance ring allows the disc clamp to be centered on the spindle and eliminates relative movement between the disc clamp and the spindle due to the tolerances in each part.

In another embodiment, a disc pack assembly includes a spindle motor hub rotatable and symmetrical about a central axis therethrough. The spindle hub includes a bottom hub flange extending radially outward therefrom and a clamp retainer portion axially extending from an upper end of the hub. The retainer portion further includes a cylindrical outer surface. The disc pack assembly further includes at least one information storage disc stacked on the spindle hub and resting on the bottom flange and an annular disc clamp securing the information storage disc to the spindle hub. The disc pack assembly further includes a disc tolerance ring located between the spindle hub and the disc clamp.

In another embodiment, a disc clamp assembly includes a disc clamp for securing an information storage disc on a spindle hub in a disc drive and means for compliantly centering the disc clamp on the spindle hub.

These and various other features as well as advantages which characterize the present invention will be apparent from a reading of the following detailed description and a review of the associated drawings.

DETAILED DESCRIPTION

Figure 1:
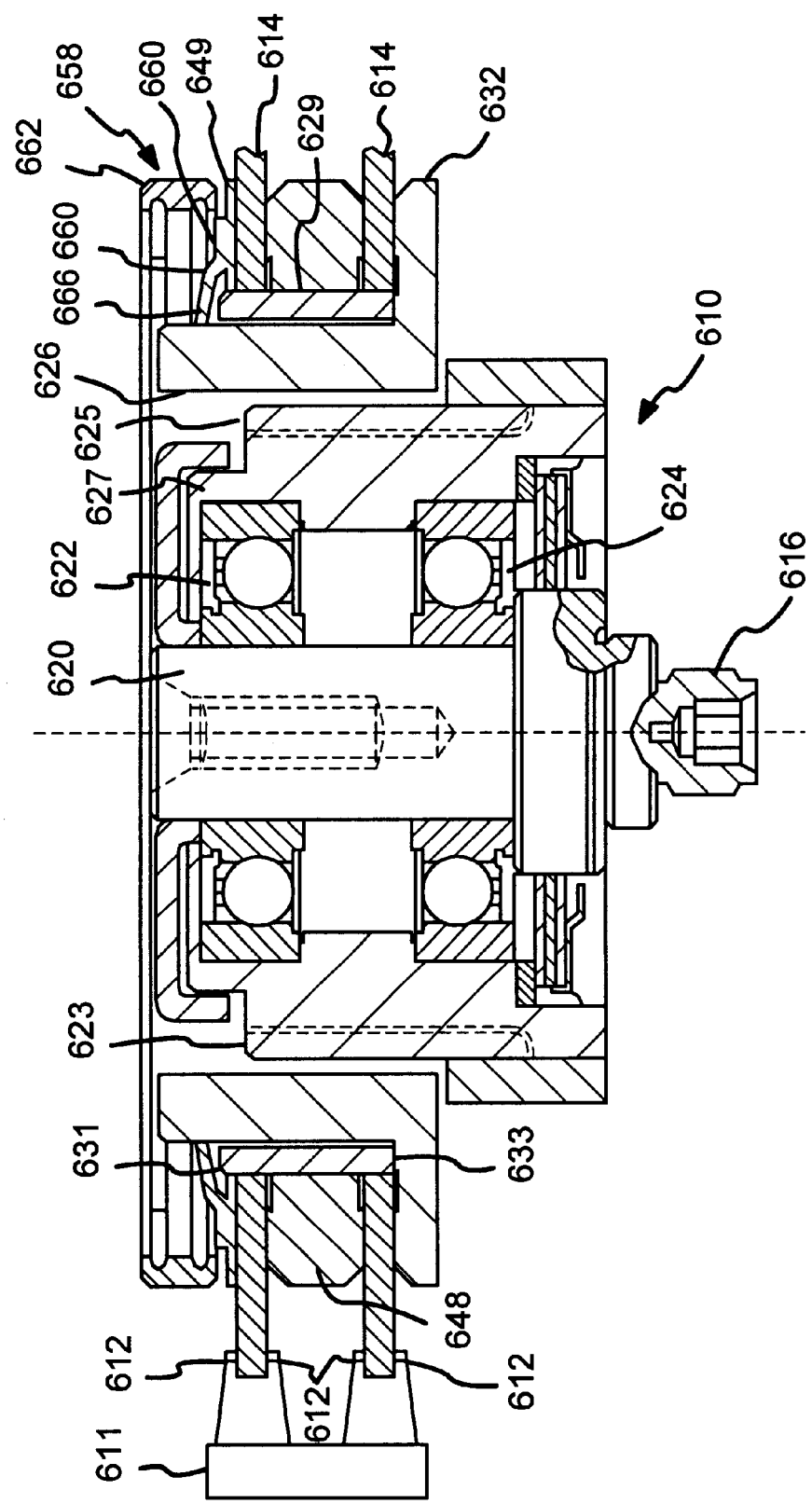
FIG. 1 is a sectional elevation view through a partial disc drive unit showing a disc clamp of the prior art.
Figure 2:
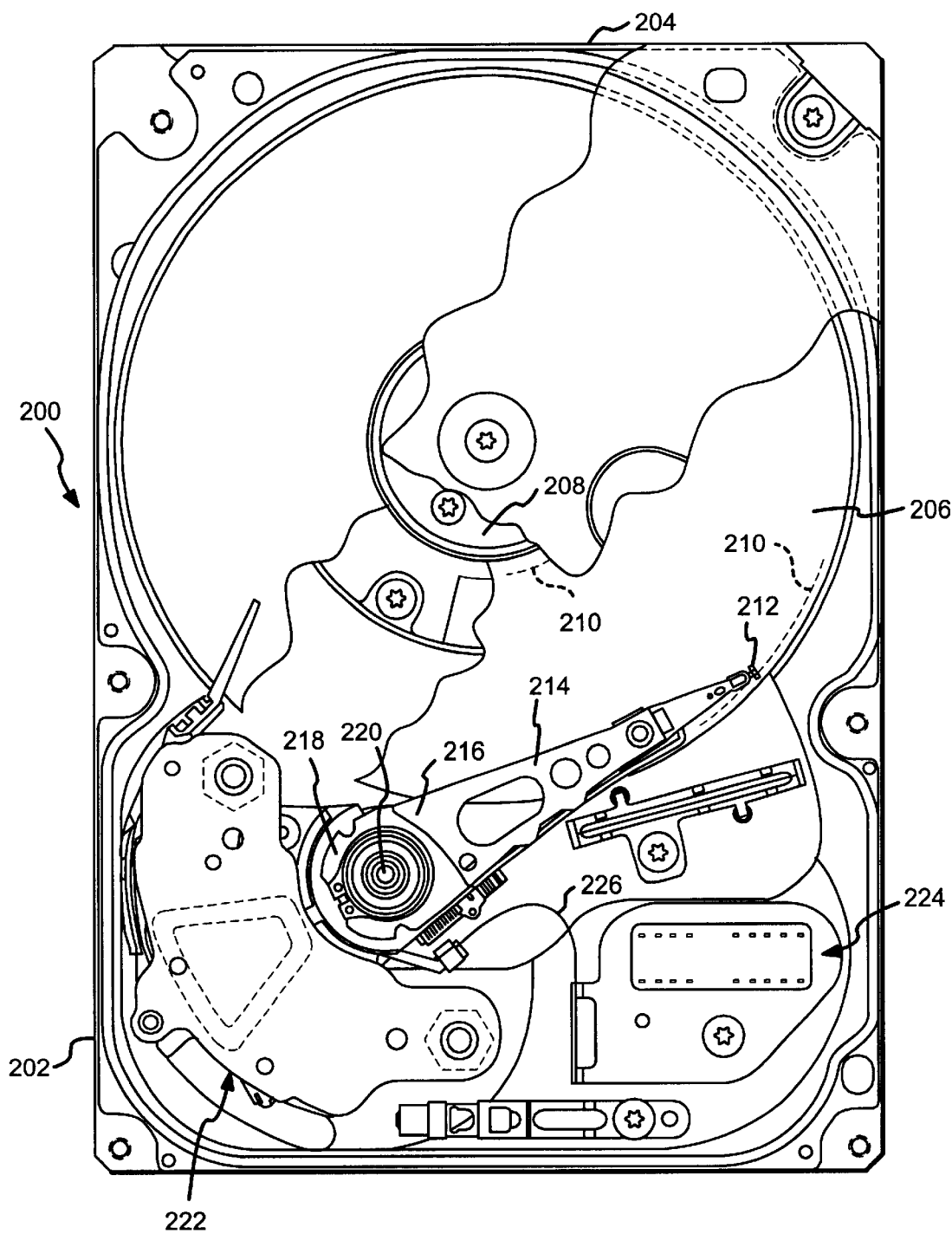
FIG. 2 is a plan view of a disc drive incorporating a preferred embodiment of the present invention showing the primary internal components.

Turning now to the drawings, and specifically to FIG. 2, shown is a plan view of a disc drive 200 which incorporates an example embodiment of the present invention. The disc drive 200 includes a base 202 to which all other components are directly or indirectly mounted and a top cover 204 (shown in partial cutaway) which, together with the base 202, forms a disc drive housing which encloses internal components and isolates these components of the disc drive 200 from external contaminants.

The disc drive 200 includes one or more discs 206 which are mounted for rotation on a spindle motor shown generally at 208. The discs 206 include on their surfaces a plurality of circular, concentric data tracks, the innermost and outermost of which are shown by dashed lines at 210, on which data are recorded via an array of vertically aligned head assemblies 212. The head assemblies 212 are supported by head suspensions, or flexures 214, which are attached to actuator arms 216. The actuator arms 216 are integral to an actuator bearing housing 218 which is mounted via an array of precision ball bearing assemblies (not designated) for rotation about a pivot shaft 220.

Power to drive the actuator bearing housing 218 in its rotation about the pivot shaft 220 is provided by a voice coil motor (VCM) shown generally at 222. The VCM 222 consists of a coil (not separately designated) which is supported by the actuator bearing housing 218 within the magnetic field of an array of permanent magnets (also not separately designated) which are fixedly mounted to the base 202, all in a manner well known in the industry. Electronic circuitry 224 controls operation of the disc drive 200. Control signals drive the VCM 222, as well as data signals to and from the heads 212, and the control signals are carried between the electronic circuitry 224 and the moving actuator assembly via a flexible printed circuit cable (PCC) 226.

It will be apparent to one of skill in the art that the proper operation of the disc drive 200 depends in large part on a controlled, precise relationship between the head assemblies 212 (and the transducers (not shown) coupled thereto) and the discs 206. Therefore, it is common in the industry to test each of the discs 206 included in the disc drive 200 before the discs 206 are assembled into a disc drive 200. Testing each of the discs 206 includes detecting thermal asperities and magnetic defects.

Figure 3:
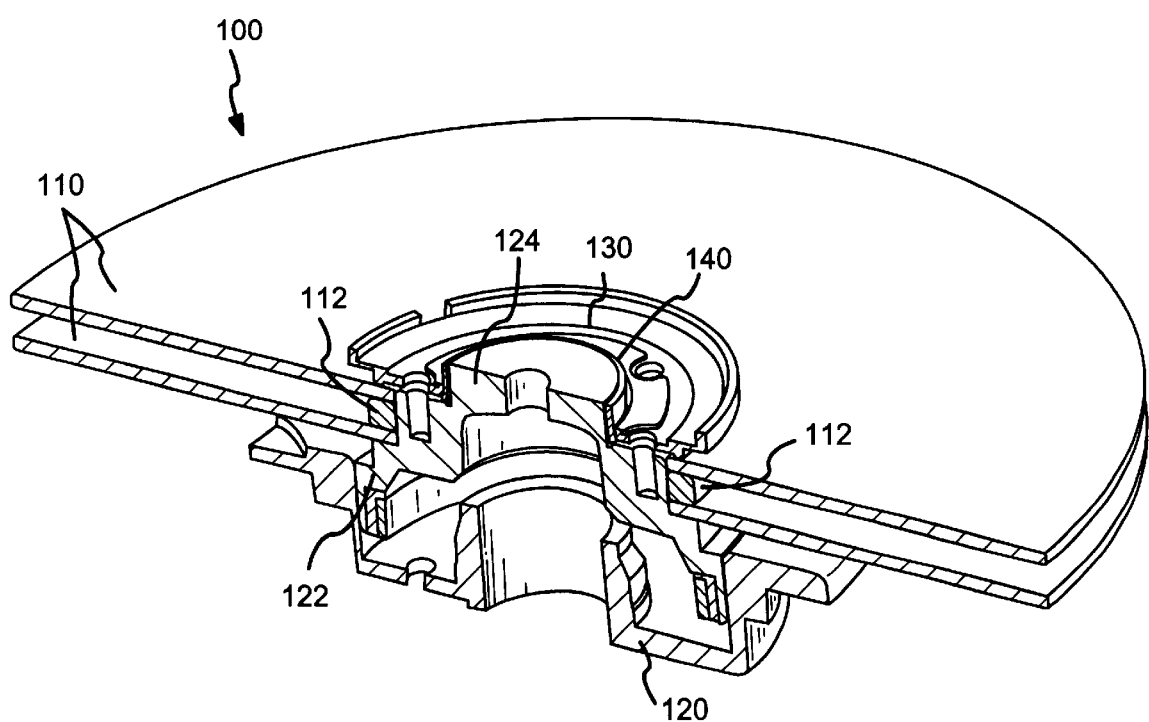
FIG. 3 is a sectional perspective view of a partial disc drive unit showing a disc clamp tolerance ring in accordance with a preferred embodiment of the present invention.
Figure 4:
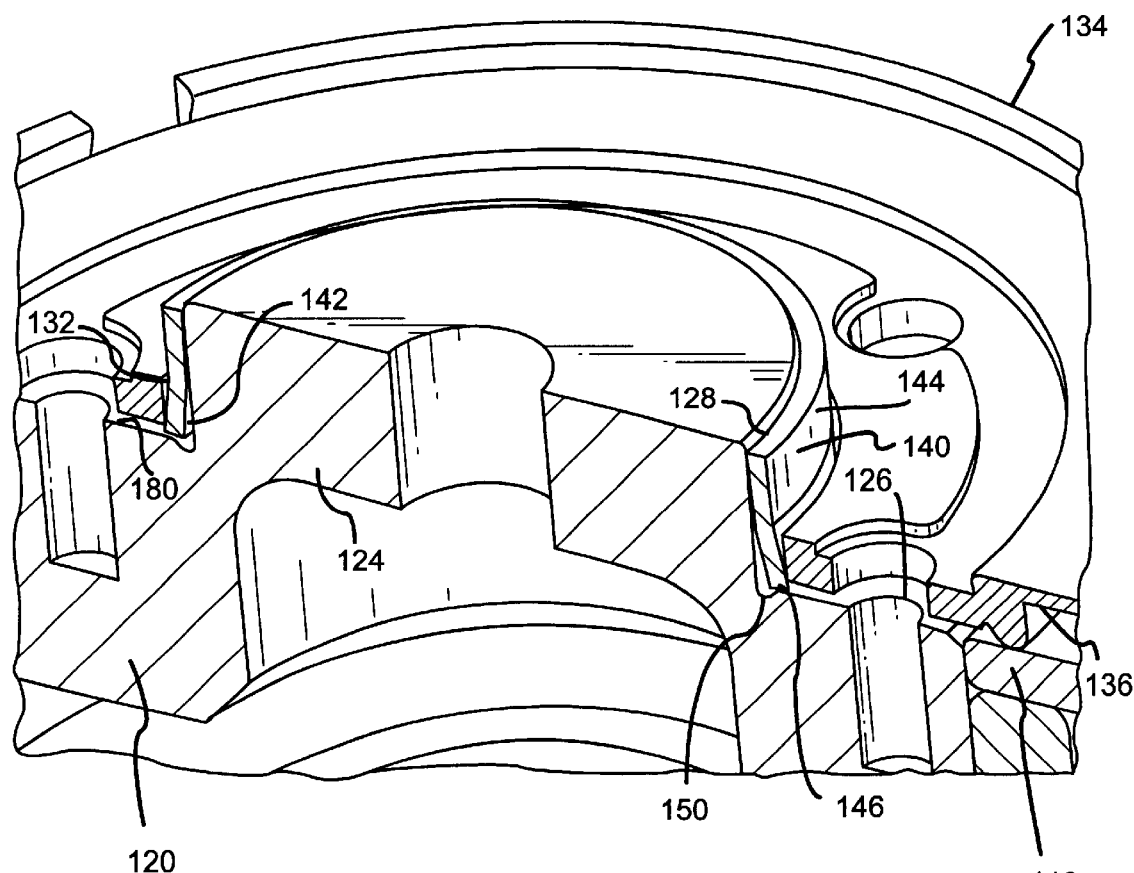
FIG. 4 is a close-up of the sectional perspective view of FIG. 3.

Referring to FIGS. 3 and 4, shown is an example embodiment of the current invention. A disc pack assembly 100 includes one or more discs 110 stacked on a spindle hub 120. The discs 110 are separated by a disc spacer 112. The discs are seated on a first portion or radial hub bottom flange 122 of the spindle hub 120 having a first diameter. The discs 110 are restrained from axial and radial movement by a disc clamp 130. The disc clamp 130 has a inner edge 132 having an inner diameter, an outer edge 134 having an outer diameter and a lower surface 136. A portion of the lower surface 136 is in contact with the uppermost disc 110 on the spindle hub 120 to restrain movement of the discs 110. The spindle hub 120 has a second portion or hub top flange 124 (also called a retainer portion) having a second diameter and a surface 128 extending axially defined by the second diameter. Generally, the first diameter is greater than the second diameter.

A tolerance ring 140 is located between the inner edge 132 of the disc clamp 130 and the surface 128 of the second portion 124 of the spindle hub 120. The tolerance ring 140 has an inner surface 142 and an outer surface 144. The inner surface 142 is located adjacent to and contacts the surface 128 of the spindle hub 120. The outer surface 144 is located adjacent to and contacts the inner edge 132 of the disc clamp 130. The tolerance ring 140 allows the disc clamp 130 to be more precisely centered on the spindle hub 120, thus reducing the need to bias the discs 110 to balance the disc stack assembly 100. Another advantage of the present invention is that it reduces the need for balancing weights (not shown) to be used on the disc clamp 130 for balancing.

In one example embodiment, the tolerance ring 140 has a first edge 146 that rests on or near a shoulder 126 on the surface 180 of the spindle hub 120. In an alternative embodiment, an undercut 150 in the spindle hub 120 is located near the intersection of the surface 180 of the spindle hub 120 and the surface 128 of the second portion 124 of the spindle hub 120. The undercut 150 allows the first edge 146 of the tolerance ring 140 to be seated partially or completely in the undercut 150. One of skill in the art will appreciate that the undercut 150 must be sized to accommodate part or all of the first edge 146 of the tolerance ring 140.

The tolerance ring 140 can be fabricated from a variety of materials, including, for example, aluminum, polyetherimide, nylon, plastic or stainless steel. Such materials are suitable for use in temperature and cleanliness sensitive environments. Materials for the tolerance ring 140 preferably are resistant to temperature effects, have minimal outgassing and produce minimal debris when being mounted with the disc clamp. Using these characteristics, one of skill in the art will appreciate that the particular material selected will depend on the conditions under which the tolerance ring 140 will be used.

Depending on the material from which the tolerance ring 140 is made, various manufacturing methods can be used to fabricated the tolerance ring 140. For example, the tolerance ring can be injection molded. Another example of a fabrication technique is fine blanking the tolerance ring, from, for example, aluminum.

Figure 5:
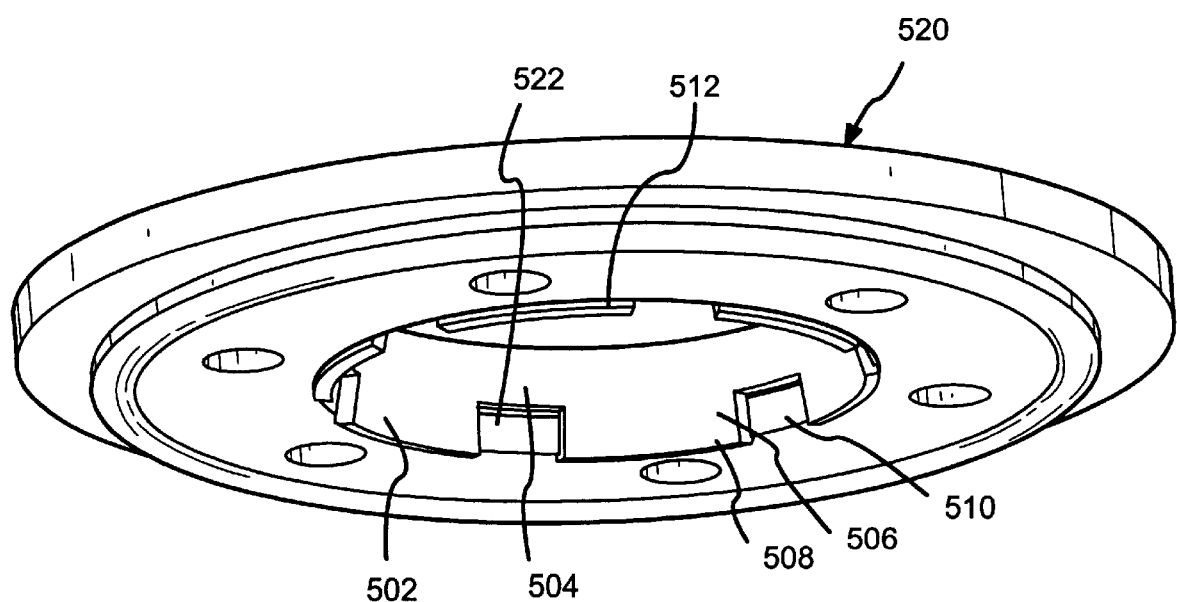
FIG. 5 is a perspective view of a disc clamp and a disc clamp tolerance ring in accordance with an example embodiment of the present invention.

FIG. 5 shows a perspective view of an example embodiment of a tolerance ring 502 and a disc clamp 520 of the present invention. The tolerance ring 502 includes a first portion 504, a second portion 506 and an outer surface 512. The outer surface fits against an inner edge 522 of the disc clamp 520. In the example embodiment shown, the first portion 504 of the tolerance ring 502 is a continuous band. The second portion 506 includes alternating spaces or notches 510 and a plurality of fingers or members 508 depending from the first portion 504.

Figure 6:
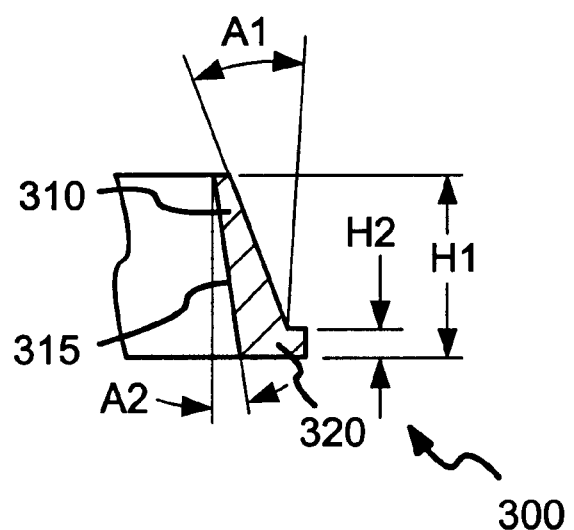
FIG. 6 is a sectional view of a disc clamp tolerance ring in accordance with an example embodiment of the present invention.

FIG. 6 shows is a cross-section of an example embodiment of a tolerance ring 300. The tolerance ring 300 includes a first section 310 and a second section 320. The second section 320 has a roughly rectangular cross-sectional area and the first section 310 has a roughly frustroconical cross-sectional area. The second section 320 also projects annularly from the first section 310. The first section 310 depends from the second section 320, whereby a contiguous inner surface 315 is formed on the tolerance ring 300. The inner surface 315 is in contact with the spindle hub (not shown) when the tolerance ring 300 is between the spindle hub (not shown) and the disc clamp (not shown).

In the example embodiment shown, tolerance ring 300 has a height H1, which is preferably about 0.070 inches. The second section 320 has a height H2, which is preferably about 0.012 inches. The cross-sectional area has a first angled section A1—A1 and a second angled section A2—A2. Preferably, A1—A1 is about 20 degrees and A2—A2 is about 8 degrees.

Figure 7:
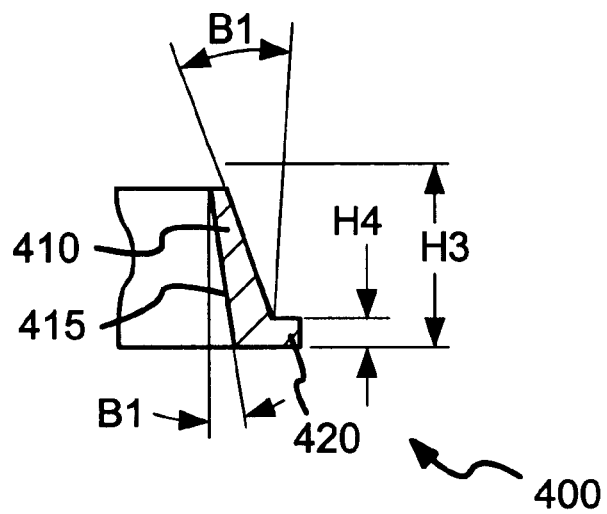
FIG. 7 is a sectional view of a disc clamp tolerance ring in accordance with an example embodiment of the present invention.

Turning now to FIG. 7, shown is an example embodiment of cross-section of a tolerance ring 400. The tolerance ring 400 includes a first section 410 and a second section 420. The second section 420 has a roughly rectangular cross-sectional area and the first section 410 has a roughly frustroconical cross-sectional area. The second section 420 also projects annularly from the first section 410. The first section 410 depends from the second section 420, whereby a conterminous inner surface 415 is formed on the tolerance ring 400. The inner surface 415 is in contact with the spindle hub (not shown) when the tolerance ring 400 is between the spindle hub (not shown) and the disc clamp (not shown).

In the example embodiment shown, tolerance ring 400 has a height H3, which is preferably about 0.059 inches. The second section 420 has a height H4, which is preferably about 0.012 inches. The cross-sectional area has a first angled section B1—B1 and a second angled section B2—B2. Preferably, B1—B1 is about 20 degrees and B2—B2 is about 10 degrees.

Referring now to FIGS. 2–7 generally, in an example embodiment a disc pack assembly (such as 100) includes a spindle motor hub (such as 120) rotatable and symmetrical about a central axis therethrough. The spindle hub (such as 120) includes a bottom hub flange (such as 122) extending radially outward therefrom and a clamp retainer portion (such as 124) axially extending along an upper surface (such as 128) of the hub (such as 120). The retainer portion (such as 124) has a cylindrical outer surface (such as 128). At least one information storage disc (such as 110) is stacked on the spindle hub (such as 120) and rests on the hub flange (such as 122). A disc spacer (such as 112) is stacked on the hub (such as 120) on top of the information storage disc (such as 110). An annular disc clamp (such as 130) secures the information storage disc (such as 110) to the spindle hub (such as 120) and is mounted on the spindle hub (such as 120) around the retainer portion (such as 124) of the hub (such as 120). The disc clamp (such as 130) includes an inner edge (such as 132). The disc tolerance ring (such as 140) centers the disc clamp (such as 130) on the spindle hub (such as 120). The disc tolerance ring (such as 140) is located between the spindle hub (such as 120) and the disc clamp (such as 130) and the disc tolerance ring (such as 140) further includes an inner portion (such as 142) and an outer portion (such as 144). The inner portion (such as 142) of the disc tolerance ring (such as 140) abuts against the outer surface (such as 128) of the retainer portion (such as 124) of the spindle hub (such as 120) and the outer portion (such as 144) of the disc tolerance ring (such as 140) abuts against inner edge (such as 132) of the disc clamp (such as 130). In one example embodiment, the outer surface (such as 128) of the retainer portion (such as 124) of the spindle hub (such as 124) includes an undercut recess (such as 150).

In another example embodiment, the disc tolerance ring (such as 300) further includes an annular projection (such as 320) projecting radially outward from the outer portion (such as 410). Preferably, the disc tolerance ring (such as 300) has a height ranging from about 0.050 to 0.070 inches.

In another example embodiment, the disc tolerance ring (such as 502) has a first circumferential section (such as 504) and a second circumferential section (such as 506), wherein the first circumferential section (such as 504) is a continuous band and the second circumferential section (such as 506) includes a plurality of alternating spaces (such as 510) and axial fingers (such as 508) depending from the first circumferential section (such as 504).

In another example embodiment, the tolerance ring (such as 502) includes a first portion (such as 504) having a first thickness and a second portion (such as 506) having a second thickness less than the thickness of the first portion (such as 504), and the second portion (such as 506) includes spaced notches (such as 510) forming axially extending fingers (such as 508) therebetween. In another example embodiment, the tolerance ring (such as 300) is made of aluminum. In another example embodiment, the tolerance ring (such as 300) is made of nylon.

In another example embodiment, a disc drive (such as 200) comprises a spindle motor hub (such as 120) carrying an information storage disc (such as 110), a plurality of transducers (not shown) carried on actuator arms (such as 216) in an actuator assembly (such as 218) for reading and writing digital data information from and to an information storage disc (such as 206) and a disc pack assembly (such as 100). The disc pack assembly (such as 100) comprises a spindle motor hub (such as 120) having a radial a hub bottom flange (such as 122), an information storage disc (such as 110) stacked on the spindle hub (such as 120) and resting on the hub flange (such as 122), a disc clamp (such as 130) to secure the information storage disc (such as 110) to the spindle hub (such as 120), with the disc clamp (such as 130) including an inner edge (such as 132) and a disc tolerance ring (such as 140) located between the spindle hub (such as 120) and the disc clamp (such as 130). The tolerance ring (such as 140) has an inner portion (such as 142) and an outer portion (such as 144). The inner portion (such as 142) of the disc tolerance ring (such as 140) abuts against the outer surface (such as 128) of the spindle hub (such as 120) and the outer portion (such as 144) of the disc tolerance ring (such as 140) abuts against the inner edge (such as 132) of the disc clamp (such as 130). In another example embodiment, the outer surface (such as 128) or shoulder (such as 126) of the spindle hub (such as 120) includes an undercut recess (such as 150). In another example embodiment, the disc tolerance ring (such as 300) further includes an annular projection (such as 320) projecting radially outward from the outer portion (such as 310).

In another example embodiment, the disc tolerance ring (such as 502) has a first circumferential section (such as 504) and a second circumferential section (such as 506). The first circumferential section (such as 504) is a continuous band and the second circumferential section (such as 506) includes a plurality of alternating spaces (such as 510) and fingers (such as 508) depending from the first circumferential section (such as 504).

In another example embodiment, a disc clamp assembly (100) includes a disc clamp (such as 130) for securing information storage discs (such as 110) on a spindle hub (such as 120) in a disc drive (such as 200) and means for compliantly centering the disc clamp (such as 130) on a spindle hub (such as 120). In another example embodiment, the means for compliantly centering the disc clamp (such as 130) is made from aluminum. In another example embodiment, the means for compliantly centering the disc clamp (such as 130) includes a first section (such as 504) and a second section (such as 506), wherein the first section (such as 504) is a continuous band and the second section (such as 504) includes a plurality of members (such as 505) depending from the first section (such as 504). In another example embodiment, the means for compliantly centering the disc clamp (such as 130) is made from nylon. In another embodiment, the means for compliantly centering the disc 110 is made from a material chosen from a group consisting of aluminum, polyetherimide, nylon, plastic and stainless steel.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the fingers depending from the continuous section of the disc clamp tolerance ring could be oval-shaped. Numerous other changes may be made which will readily suggest themselves to those skilled in the art and which are encompassed in the spirit of the invention disclosed and as defined in the appended claims.

What is claimed is:

1. A disc pack assembly comprising:
    a spindle motor hub rotatable and symmetrical about a central axis therethrough, the spindle hub having a bottom hub flange extending radially outward therefrom and a clamp retainer portion axially extending from an upper end of the hub, the retainer portion having a cylindrical outer surface with a maximum diameter;
    at least one information storage disc stacked on the spindle hub and resting on the hub flange;
    an annular disc clamp securing the information storage disc to the spindle hub mounted on the spindle hub around the retainer portion of the hub, the disc clamp including an inner edge; and
    a disc tolerance ring centering the disc clamp on the spindle hub, the disc tolerance ring located between the spindle hub and the disc clamp, the disc tolerance ring further including an inner portion and an outer portion, the inner portion of the disc tolerance ring abutting against the maximum diameter outer surface of the retainer portion of the spindle hub and the outer portion of the disc tolerance ring abutting against the inner edge of the disc clamp.

2. The disc pack of claim 1 wherein the outer surface of the retainer portion of the spindle hub includes an undercut recess.

3. The disc pack of claim 1 wherein the disc tolerance ring further includes an annular projection projecting radially outward from the outer portion.

4. The disc pack of claim 3 wherein the disc tolerance ring has a height ranging from about 0.050 to 0.070 inches.

5. The disc pack of claim 1, wherein the disc tolerance ring has a first circumferential section and a second circumferential section, wherein the first circumferential section is a continuous band and the second circumferential section includes a plurality of spaced axial fingers depending from the first circumferential section.

6. The disc pack of claim 1, wherein the tolerance ring includes a first portion having a first thickness and a second portion having a second thickness less than the thickness of the first portion, wherein the second portion includes spaced axially extending fingers.

7. The disc pack of claim 1, wherein the tolerance ring is made of aluminum.

8. The disc pack of claim 1, wherein the tolerance ring is made of nylon.

9. A disc drive comprising:
    a spindle motor carrying an information storage disc, a plurality of transducers carried on actuator arms in an actuator assembly for reading and writing digital data information from and to an information storage disc in a disc pack assembly comprising;

a spindle hub having a maximum diameter outer surface and a radial hub bottom flange wherein the information storage disc rests on the hub bottom flange;

a disc clamp securing the information storage disc to the spindle hub, the disc clamp including an inner edge; and a disc tolerance ring located between the spindle hub and the disc clamp, the disc tolerance ring having an inner portion and an outer portion, the inner portion of the disc tolerance ring abutting against the maximum diameter outer surface of the spindle hub and the outer portion of the disc tolerance ring abutting against the inner edge of the disc clamp.

10. The disc drive of claim 9, wherein the outer surface of the spindle hub includes an undercut recess.

11. The disc drive of claim 10, wherein the tolerance ring has a bottom edge that fits within the undercut recess in the spindle hub.

12. The disc drive of claim 9, wherein the disc tolerance ring further includes an annular projection projecting radially outward from the outer portion.

13. The disc drive of claim 9, wherein the disc tolerance ring has a first circumferential section and a second circumferential section, wherein the first circumferential section is a continuous band and the second circumferential section includes a plurality of spaced fingers depending from the first circumferential section.

14. A disc clamp assembly, comprising:

a disc clamp for securing an information storage disc on a spindle hub in a disc drive; and means for compliantly centering the disc clamp on the spindle hub.

15. The disc clamp assembly of claim 14, wherein the means for compliantly centering the disc is made from aluminum.

16. The disc clamp assembly of claim 14, wherein the means for compliantly centering includes a first section and a second section, wherein the first section is a continuous band and the second section includes a plurality of spaced fingers depending from the first section.

17. The disc clamp assembly of claim 14, wherein the means for compliantly centering the disc is made from nylon.

18. The disc clamp assembly of claim 14, wherein the means for compliantly centering the disc is made from a material chosen from a group consisting of aluminum, polyetherimide, nylon, plastic and stainless steel.

* * * * *